United States Patent [19]

Miller

[11] Patent Number: 4,911,349

[45] Date of Patent: Mar. 27, 1990

[54] END CAP WITH CAPTIVE STUD FOR ARTICLE CARRIERS

[75] Inventor: Dennis J. Miller, South Rockwood, Mich.

[73] Assignee: Starboard Industries, Inc., Auburn Hills, Mich.

[21] Appl. No.: 375,126

[22] Filed: Jul. 3, 1989

[51] Int. Cl.⁴ .................. B60R 9/04; E04F 19/02; F16B 39/282

[52] U.S. Cl. .................. 224/326; 224/309; 24/290; 411/169; 411/85

[58] Field of Search .............. 224/321, 325, 326, 324, 224/327, 329–331, 309, 317; 411/398, 169, 409, 84, 85, 399; 24/290, 291, 694

[56] References Cited

U.S. PATENT DOCUMENTS

| | | | |
|---|---|---|---|
| 3,308,483 | 3/1967 | Miller | 4/236 |
| 4,170,322 | 10/1979 | Bott | 224/326 |
| 4,343,419 | 8/1982 | Mareydt | 224/326 |
| 4,501,386 | 2/1985 | Rasor et al. | 224/326 |
| 4,767,040 | 8/1988 | Miller et al. | 224/326 |

FOREIGN PATENT DOCUMENTS

| | | | |
|---|---|---|---|
| 473375 | 2/1929 | Fed. Rep. of Germany | 411/85 |
| 286611 | 8/1928 | United Kingdom | 24/291 |

*Primary Examiner*—Henry J. Recla
*Assistant Examiner*—James G. Barrow
*Attorney, Agent, or Firm*—Reising, Ethington, Barnard, Perry & Milton

[57] ABSTRACT

A slat assembly for vehicle luggage racks is disclosed with a pre-assembled slat and end cap. The end cap includes a mounting member for insertion into the end of the slat. A hole through the mounting member receives a headed stud as a separate and separable part from the mounting member. When the mounting member is inserted into the slat, the stud is held captive by the overlying rub strip on the slat or the flanges of the slat.

6 Claims, 1 Drawing Sheet

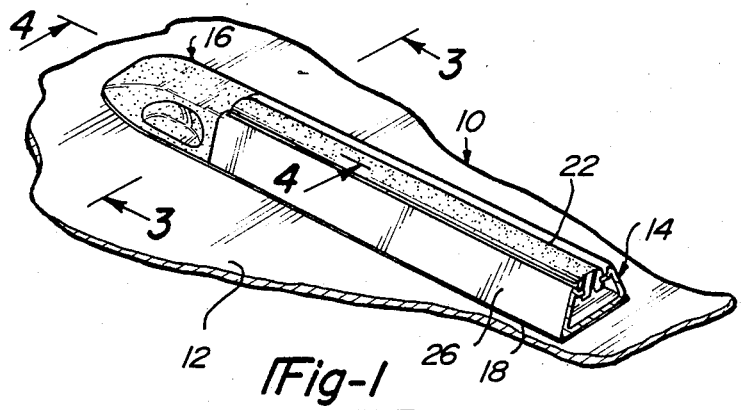
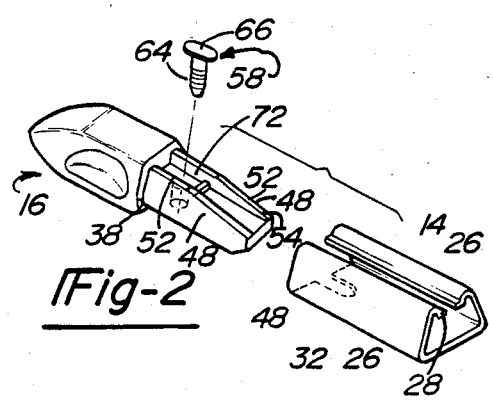
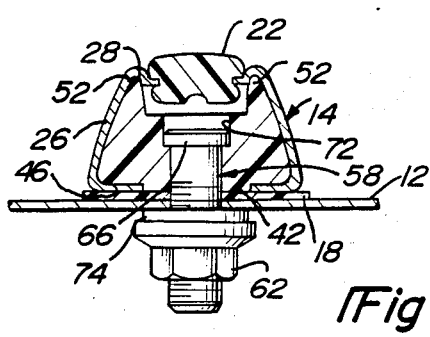
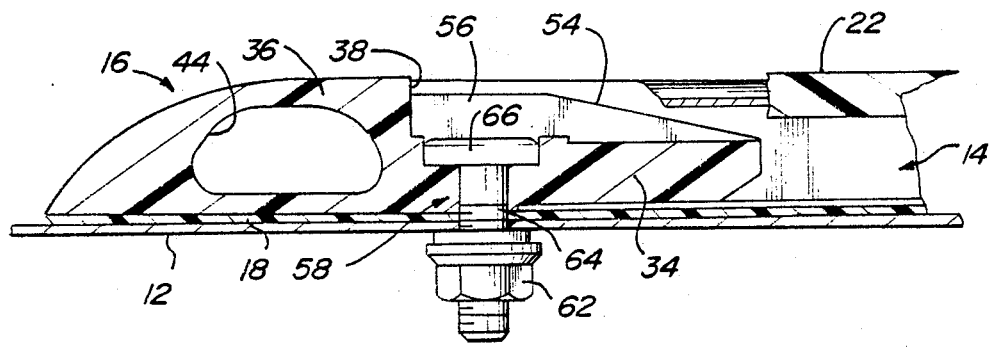

END CAP WITH CAPTIVE STUD FOR ARTICLE CARRIERS

FIELD OF THE INVENTION

This invention relates to article carriers, such as luggage racks for automotive vehicles; more particularly, it relates to an improved end cap and slat assembly for such article carriers.

BACKGROUND OF THE INVENTION

Vehicle manufacturers commonly offer article carriers such as luggage racks as an optional item for sale which a new vehicle. Such article carriers are adapted to be mounted on a body panel of the vehicle, either the rear deck or the vehicle top, and the carrier is installed on a vehicle assembly line. A typical article carrier for installation on the rear deck is comprised of a pair of side rails each having a stanchion at the front and rear end and a cross rail extending between the rear stanchions. A plurality of load supporting slat assemblies are disposed within the side rails and are individually secured to the deck lid. A slat assembly typically comprise a sheet metal slat in a channel-shape which is provided with an end cap at each end. Each end cap may have an opening therethrough to receive a tie down cord for articles to be carried on the rack. A protective rub strip extends lengthwise of the slat and closes the upper side of the channel formed thereby and may be snap fitted into place to engage the upper edges of the slat. An insulating liner is disposed between the bottom of the slat and the body panel and fastening means are provided for securing the slat to the panel. It is desired to provide the slats as pre-assembled units so as to minimize the number of parts that must be handled on the assembly line for installing the article carrier. For this purpose, it is also desired to avoid the need for handling separate fastener elements such as screws when the slats are installed on the vehicle.

In the prior art it is known to provide slats for luggage racks with pre-attached end caps, as shown in the Miller et al U.S. Pat. No. 4,767,040 granted Aug. 30, 1988. The slat disclosed in this patent is provided with an end cap having a mounting member which is inserted into the end of the channel-shaped slat and secured thereto by a detent comprising a resilient tang in the base of the slat which coacts with a ramp-shaped recess on the bottom of the mounting portion of the end cap. In order to secure the end cap and slat to the vehicle body panel, a stud is molded into the end cap. In this arrangement, the entire end cap and slat assembly is assembled by the luggage rack manufacturer and is shipped to the vehicle manufacturer as an integral unit ready for installation on the vehicle body panel. A disadvantage of the end cap of Miller et al is the cost associated with molding the stud in place and further, the end caps which are defective in manufacture cannot be reground for recovering the plastic material.

The Rasor et al Pat. No. 4,501,136 granted Feb. 26, 1985 also discloses a luggage rack slat with a pre-attached end cap. The slat disclosed by this patent is provided with an end cap having a portion which is inserted into the end of the channel-shaped slat and secured thereto by a drive pin extending through the base of the slat. A screw hole is provided in the tongue portion of the end cap and receives a mounting screw which extends through the body panel of the vehicle and is held by a nut when the slat is installed. After the nut is tightened on the screw, the rub strip is snap fitted into the top of the slat. In this arrangement, the threaded stud is not integral with the end cap and is a separate piece to be added at the time of installation on the vehicle body panel.

A luggage rack slat with an end cap is disclosed in the Bott Pat. No. 4,170,332 granted Oct. 7, 1979 and the Mareydt Pat. No. 4,343,419 granted Aug. 10, 1982. The slat and end cap as disclosed in these patents are not pre-assembled and a threaded fastener is used to attach the end cap and the slat member to the vehicle body panel when the luggage rack is installed on the vehicle.

It is a general object of this invention to provide an improved pre-assembled end cap and slat for an article carrier which overcomes certain disadvantages of the prior art.

SUMMARY OF THE INVENTION

According to this invention, there is provided a combined slat and end cap for an article carrier which is economical to manufacture and which greatly facilitates installation. This is accomplished with a unitary molded end cap pre-assembled with the slat and carrying a captive stud in the assembly for securing the end cap and slat to the body panel. The captive stud is separable from the end cap and is held captive only after assembly of the end cap and slat.

Further, in accordance with this invention, an article carrier slat assembly comprises a slot with a base member and a pair of oppositely disposed spaced side walls forming a channel, each of the side walls having an in-turned flange strip. An end cap extends into one end of the slat. A rub strip is supported on the flange strips and covers the channel. Improved fastening means secures the end cap to the slat and secures the slat to the body panel. The improved fastening means comprises a stud having a shank and a non-circular head; the shank is inserted through a hole in the end cap mounting member and the head is received in a receptacle formed around the upper end of the hole. The receptacle is non-circular and prevents rotation of the head of the stud. The stud is dropped into the end cap hole and receptacle before the end cap is inserted into the slat. After insertion, the stud is held captive by either the rub strip or one or both of the in-turned flange strips. In this arrangement, the pre-assembled slat assembly may be secured to the body panel by a nut on the end of the stud which is nonrotatably held in the end cap. Further, in accordance with the invention, the end cap may be additionally secured to the slat, as a pre-assembly, by adhesively securing the insulating liner strip to the end cap and to the slat, or the mounting member of the end cap may have a friction fit with the slat.

A more complete understanding of this invention may be obtained from the detailed description that follows taken with the accompanying drawings.

DESCRIPTION OF THE DRAWINGS

FIG. 1 is a perspective view of one end of an end cap and slat assembly mounted on a vehicle body panel;

FIG. 2 is an exploded view of an end cap and a slat;

FIG. 3 is a cross-sectional view of the slat assembly taken on lines 3—3 of FIG. 1; and FIG. 4 is a cross-sectional view taken on lines 4—4 of FIG. 1.

BEST MODE FOR CARRYING OUT THE INVENTION

Referring now to the drawings, there is shown an illustrative embodiment of the invention in a slat assembly for use in a luggage carrier of an automotive vehicle. It will be appreciated as the description proceeds, that the invention may be used in other applications and may be embodied in different forms.

FIG. 1 shows a slat assembly 10 mounted on a body panel, such as a deck lid 12 of an automotive vehicle. It will be understood that the slat assembly 10 shown in FIG. 1 forms a part of a luggage carrier which may comprise a plurality of such slat assemblies together with side and rear rails. Each slat assembly comprises, in general, a slat 14 with an end cap 16 at each end. The slat assembly also comprises an insulating liner 18 disposed between the slat and the body panel 12. The upper side of the slat 14 is provided with a protective rub strip 22. A set of support slat assemblies 10, when used in conjunction with luggage rack rails are adapted to support an article such as a piece of luggage.

The remaining FIGS. 2, 3 and 4 show details of construction of the slat assembly 10 which will now be described. The slat 14 is formed of sheet metal, such as stainless steel, and is provided with a base 24 and a pair of upstanding side walls 26. Each of the side walls is rolled over at its upper edge and terminates in an inwardly directed flange strip 28. The base 24 is provided at its free end with a centrally disposed, longitudinally extending slot 32. The purpose of the slot 32 will be described subsequently in conjunction with the end cap 16.

The end cap 16 is adapted to be pre-assembled and secured to the slat 14. It is also adapted for securing the slat assembly 10 to the body panel. The fastening means for this purpose will be described presently. The end cap 16 is a unitary molded plastic body and comprises a mounting member 34 and a cap member 36. The mounting member 34 is adapted to telescope into the end of the slat 14 and the cap member 36 is disposed externally of the slat. The cap member 36 of the end cap 16 is of somewhat larger cross-section than mounting member 34 at its juncture therewith and is provided with a peripherally extending axial shoulder 38. The mounting member 34 is provided on its bottom surface with a boss 42 of the same shape as the slot 32 in the base of the slat 14. The axial shoulder 38 extends around the end of the cap member 36 and also around the boss 42 and has a transverse dimension the same as the thickness of the sheet metal of the slat 14 so that the surface of the cap member and the surface of the slat are flush when the end cap is telescoped into the slat. The cap member 36 is provided with a transversely extending eyelet 44 for receiving a tie down cord or end fitting for securing articles on the slat assembly.

The mounting member 34 of the end cap 16 comprises a bottom wall 46 and a pair of upstanding side walls 48 defining a channel therebetween. Each of the side walls 48 terminates at its upper end in a rib 52 extending longitudinally of the mounting member. The ribs 52 have a portion which is sloped upwardly in height above the base 46 from the free end of the mounting member 34 to form a ramp 54. Each rib 52 also includes a flat portion 56 extending from the end of the ramp 54 to the shoulder 38. The flat portion 56 is at a uniform height above the base 46 and this height has a slightly greater dimension than the clearance between the base of the slat 24 and the flange strips 28 prior to insertion of the mounting member 34 into the end of the slat. This relationship provides a friction fit between the mounting member 34 and the slat 14 with the ramps 54 facilitating the insertion of the mounting portion to achieve the interference or friction fit with the slat in abutment with the shoulder 38. This friction fit constitutes a fastening means for securing the end cap 16 to the slat 14 when they are assembled together.

For the purpose of securing the assembly to the vehicle panel 12, fastening means in the form of a threaded stud 58 and a nut 62 are provided. The stud 58 has a threaded shank 64 and a head 66 which is non-circular; instead, it is oval in shape. The mounting member 34 of the end cap 16 is formed with a through-hole 68 extending from top to bottom for receiving the shank 64 of the stud. To accommodate the head 66 of the stud, a receptacle 72 is provided surrounding the hole 66. The receptacle 72 is non-circular in cross-section. It is rectangular and is adapted to receive the head 66 and restrain it from rotation. The stud 58 extends through the mounting member 34 and through an opening in the insulating liner 18 and through a hole in the body panel 12 and receives a washer 74 and the nut 62 to retain the slat assembly to the body panel.

The slat 10 is assembled as follows. The stud 58 is dropped into the hole 68 in the mounting member 34 of the end cap 16. The head 66 of the stud is oriented so that it is seated in the receptacle 72 with the head being restrained against rotation by engagement with the side walls of the receptacle. The mounting member 34 is inserted into the end of the slat 14 until the shoulder 38 abuts against the end of the slat. In this condition, there is a friction fit between the mounting member 34 and the slat 14 so that the parts are held in the assembled relationship. Then, the rub strip 22 is snapped into position between the opposed flange strips 28. In this condition, the stud 58 is held captive by the overlying rub strip 22 and, in the absence of the rub strip, it would be held captive by the overlying flange strips 28. When the mounting member 34 is inserted into the end of the slat 14 the boss 42 enters the slot 32 in an interlocking relationship so that the shank 64 of the stud 58 extends through the base 24 of the slat. The insulating liner 18 is provided on its upper surface with an adhesive which adheres to the material of the end cap 16 and also the material of the slat 14. The insulating liner 18 extends from the free end of the end cap 16 throughout the length of the slat 14 and is adhered to the bottom surfaces thereof and, by reason of spanning the end cap and slat, further secures them in the assembled relationship.

The slat assembly, assembled as described above, is readily mounted on the vehicle body panel by inserting the stud 58 (and also the stud at the opposite end, not shown) into the mounting hole in the body panel 12 and applying the nut 62 to the stud. Thus, the slat assembly is supplied to the vehicle manufacturer as a unit. It is readily installed on the vehicle as a unit without loose parts, except the nuts, and without need for special tooling.

Although the description of this invention has been given with reference to a particular embodiment, it is not to be construed in a limiting sense. Many variations and modifications will now occur to those skilled in the art. For a definition of the invention reference is made to the appended claims.

What is claimed is:

1. A slat assembly for use in an article carrier for an automotive vehicle, said slat assembly being of the type adapted to be mounted on a body panel of said vehicle and including a slat having a base member and a pair of oppositely disposed, spaced side walls forming a channel, each of said side walls having an in-turned flange strip, a rub strip supported on said flange strips and covering said channel, and including an end cap, said end cap being a unitary plastic body comprising a cap member and a mounting member said mounting member having a cross-section which is slidably inserted into said one end of said slat, said end cap including an abutment shoulder between said mounting member and said cap member and adapted to engage the end of said slat when said mounting member is inserted into said channel, and fastening means for securing said end cap to said slat and for securing said slat to said body panel, said end cap and slat being pre-assembled for mounting as a unit on said body panel, the improvement wherein said fastening means comprises:

a stud having an elongated shank and a non-circular head which is wider than said shank, a hole extending through said end cap mounting member from top to bottom, said hole being large enough to receive said shank but being too small for said head, a receptacle formed in said end cap mounting member surrounding the upper end of said hole, said receptacle being non-circular for receiving said head and preventing rotation thereof, said stud being adapted for insertion of said shank into said hole with said head in said receptacle before said end cap mounting member is inserted into the end of said slat, said base member defining a slot at said one end of said slat, said slot being adapted to receive the shank of said stud when said end cap mounting member is inserted into the end of said slat, one of said strips overlying said stud after said end cap mounting member is inserted into the end of said slat and holding said shank of said stud captive in said hole, the shank of said stud being long enough to extend through said body panel with said slat assembly seated on said body panel and being adapted to receive a nut for securing said end cap and said slat to said body panel.

2. The slat assembly as defined in claim 1 wherein said fastening means for securing said end cap to said slat includes an insulating liner strip adhesively secured to and spanning between the lower surfaces of said end cap and said slat.

3. The slat assembly as defined in claim 1 wherein said fastening means for securing said end cap to said slat includes a friction fit between surface portions of said mounting member of said end cap and surface portions of said slat.

4. The slat assembly as defined in claim 3 wherein said surface portions of said mounting member comprises a pair of ribs on the upper surface thereof and said surface portions of said slat comprise said flange strips.

5. The slat assembly as defined in claim 1 wherein said one of said strips overlying said stud is said rub strip.

6. The slat assembly as defined in claim 1 wherein said one of said strips overlying said stud is one of said flange strips.

* * * * *